(12) United States Patent
Park et al.

(10) Patent No.: US 12,299,611 B2
(45) Date of Patent: May 13, 2025

(54) METHOD AND APPARATUS FOR PROVIDING COUNSELING SERVICE

(71) Applicant: KAKAO CORP., Jeju-si (KR)

(72) Inventors: Han Yong Park, Seongnam-si (KR); Hye Jin Oh, Seongnam-si (KR); Jae Il Lee, Seongnam-si (KR); Geon Woo Kim, Seongnam-si (KR); Jun Kyu Park, Seongnam-si (KR); Chan Hui Seok, Seongnam-si (KR); Seung Hwan Lee, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 128 days.

(21) Appl. No.: 17/853,934

(22) Filed: Jun. 30, 2022

(65) Prior Publication Data

US 2023/0004897 A1 Jan. 5, 2023

(30) Foreign Application Priority Data

Jun. 30, 2021 (KR) ........................ 10-2021-0085939

(51) Int. Cl.
*G06Q 10/00* (2023.01)
*G06Q 10/0631* (2023.01)

(52) U.S. Cl.
CPC .............................. *G06Q 10/06311* (2013.01)

(58) Field of Classification Search
CPC .................... G06Q 10/02; G06Q 10/06–06315
See application file for complete search history.

(56) References Cited

U.S. PATENT DOCUMENTS

| 10,192,179 | B1 * | 1/2019 | Agarwal | ........ G06Q 10/063114 |
| 10,574,824 | B2 * | 2/2020 | Kannan | ............... H04M 3/5166 |
| 10,673,787 | B2 * | 6/2020 | Koohmarey | ....... G06Q 30/0641 |

(Continued)

FOREIGN PATENT DOCUMENTS

| KR | 20120050980 A | 5/2012 |
| KR | 1020190011571 A | 2/2019 |
| KR | 1020190104119 A | 9/2019 |

OTHER PUBLICATIONS

Korean Office Action for KR Application No. 10-2021-0085939 mailed on Aug. 30, 2023, citing the above reference(s).

(Continued)

*Primary Examiner* — Hafiz A Kassim
*Assistant Examiner* — Scott M Ross
(74) *Attorney, Agent, or Firm* — Seed IP Law Group LLP

(57) ABSTRACT

Provided are a method and apparatus for providing a counseling service. A method of operating a counseling center server interworking with an instant messaging service includes acquiring, based on an input of a first user for requesting counseling through a channel of a second user registered in the instant messaging service, a counseling type of the requested counseling, creating a first type of counseling ticket corresponding to unmanned counseling or a second type of counseling ticket corresponding to manned counseling based on the counseling type, monitoring a state change event that changes a state of the counseling ticket, and controlling an interfacing object included in a chat interface for counseling provided to a terminal of the first user to correspond to the channel to indicate the counseling type and the changed state of the counseling ticket.

18 Claims, 17 Drawing Sheets

(56) References Cited

U.S. PATENT DOCUMENTS

| | | | |
|---|---|---|---|
| 10,798,245 B2* | 10/2020 | Kannan | H04M 3/5235 |
| 2007/0203778 A1* | 8/2007 | Lowson | G06Q 10/06316 |
| | | | 705/7.14 |
| 2014/0074614 A1* | 3/2014 | Mehanian | G06Q 30/0201 |
| | | | 705/14.64 |
| 2017/0090736 A1* | 3/2017 | King | G06Q 10/101 |
| 2017/0221071 A1* | 8/2017 | York | G06Q 10/063112 |
| 2017/0277993 A1* | 9/2017 | Beaver | G06Q 30/0201 |
| 2018/0054523 A1* | 2/2018 | Zhang | H04M 7/0045 |
| 2019/0104092 A1* | 4/2019 | Koohmarey | H04L 51/02 |
| 2020/0302364 A1* | 9/2020 | Singh | G06N 20/00 |
| 2021/0004825 A1* | 1/2021 | Adibi | H04L 51/02 |

OTHER PUBLICATIONS

Korean Office Action for KR Application No. 10-2021-0085939 mailed on Feb. 20, 2023, citing the above reference(s).

* cited by examiner

METHOD AND APPARATUS FOR PROVIDING COUNSELING SERVICE

CROSS-REFERENCE TO RELATED APPLICATION

This application claims the benefit of Korean Patent Application No. 10-2021-0085939 filed on Jun. 30, 2021, in the Korean Intellectual Property Office, the entire disclosure of which is incorporated herein by reference for all purposes.

BACKGROUND

1. Field of the Invention

One or more example embodiments relate to a method and apparatus for providing a counseling service.

2. Description of the Related Art

Recently, with development of mobile smart devices, the use of online platform services for interaction with other users through networks is increasing. Typical examples of the online platform services for interaction with other users include a social networking service (SNS), which is an online platform that creates and strengthens social relationships through communication, information sharing, and social network expansion among users, and an instant messaging service (IMS), which is an online platform for real-time content communication among two or more users. As the interaction among users through such mobile devices increases, the online platform service supports not only a chat service for daily conversation with other users, but also a function of providing various services based on communication among a plurality of users.

Contact center as a service (CCaaS) is a cloud-based service-type contact center solution may be a service that provides an online counseling platform with various counseling functions including a chat interface and a chatbot. There is a need for development of CCaaS technology for companies to efficiently conduct and manage counseling by applying smart technology while consumers may request non-face-to-face counseling using mobile devices in an easy and quick way.

SUMMARY

According to an aspect, there is provided a method of operating a counseling center server interworking with an instant messaging service, including acquiring, based on an input of a first user for requesting counseling through a channel of a second user registered in the instant messaging service, a counseling type of the requested counseling, creating a first type of counseling ticket corresponding to unmanned counseling or a second type of counseling ticket corresponding to manned counseling based on the counseling type, monitoring a state change event that changes a state of the counseling ticket, and controlling an interfacing object included in a chat interface for counseling provided to a terminal of the first user to correspond to the channel to indicate the counseling type and the changed state of the counseling ticket.

The counseling type may include a first counseling type corresponding to the unmanned counseling, and a second counseling type corresponding to the manned counseling.

The controlling of the interfacing object may further include switching the counseling type based on a request for switching between the manned counseling and the unmanned counseling received from the first user through the chat interface, and controlling the interfacing object to correspond to the switched counseling type.

The controlling of the interfacing object may include transmitting a signal for controlling the interfacing object based on whether the counseling type is switched and whether the state of the counseling ticket is changed upon occurrence of the state change event.

Based on the signal for controlling the interfacing object, at least one of operations may be performed for the interfacing object, and the operations may include changing a visual sign included in the interfacing object, adding a visual effect to the interfacing object, and changing a guide comment included in the interfacing object.

The creating of the counseling ticket may include creating the first type of counseling ticket when the counseling type is a first counseling type corresponding to the unmanned counseling, and creating the second type of counseling ticket when the counseling type is a second counseling type corresponding to the manned counseling.

The monitoring of the state change event may further include changing the state of the counseling ticket to an end state based on an end event occurring as an end condition of the counseling ticket is satisfied.

The monitoring of the state change event may further include at least one of changing the state of the second type of counseling ticket to a progress state based on a connection event occurring as a counselor for the channel allocated with the second type of counseling ticket accesses a chat room corresponding to the second type of counseling ticket, and changing the state of the second type of counseling ticket to a pending state based on a pending event that occurs as a pending condition of the second type of counseling ticket is satisfied.

The acquiring of the counseling type may further include setting the counseling type to a default value of a predetermined counseling type corresponding to the channel, and controlling the interfacing object to indicate the counseling type set to the default value on the chat interface.

The unmanned counseling may include a counseling type conducted using a chatbot linked to the channel.

The manned counseling may include a counseling type conducted with a counselor linked to the channel.

The interfacing object may include a function of requesting for switch between the manned counseling and the unmanned counseling.

According to another aspect, there is provided a method of operating a terminal of a first user using a counseling service interworking with an instant messaging service, including receiving an input for requesting counseling through a channel of a second user registered in the instant messaging service through a website of the second user, displaying a chat interface for counseling corresponding to the channel, displaying an interfacing object indicating a counseling type through the channel on the chat interface, receiving control information of the interfacing object created based on the counseling type and a changed state of a counseling ticket created to correspond to the counseling type, and controlling the interfacing object based on the control information.

According to another aspect, there is provided a counseling center server including at least one processor configured to acquire, based on an input of a first user requesting counseling through a channel of a second user registered in an instant messaging service, a counseling type of the requested counseling, create a first type of counseling ticket corresponding to unmanned counseling or a second type of counseling ticket corresponding to manned counseling based on the counseling type, monitor a state change event that changes a state of the counseling ticket, and control an interfacing object included in a chat interface for counseling provided to a terminal of the first user to correspond to the channel to indicate the counseling type and the changed state of the counseling ticket.

The counseling type may include a first counseling type corresponding to the unmanned counseling, and a second counseling type corresponding to the manned counseling.

The processor may be configured to, in controlling the interfacing object, switch the counseling type based on a request for switching between the manned counseling and the unmanned counseling received from the first user through the chat interface, and control the interfacing object to correspond to the switched counseling type.

The processor may be configured to, in creating the counseling ticket, create the first type of counseling ticket when the counseling type is a first counseling type corresponding to the unmanned counseling, and create the second type of counseling ticket when the counseling type is a second counseling type corresponding to the manned counseling.

The processor may be configured to, in monitoring the state change event, change the state of the counseling ticket to an end state based on an end event occurring as an end condition of the counseling ticket is satisfied.

The processor may be configured to perform, in monitoring the state change event, at least one of operations of changing the state of the second type of counseling ticket to a progress state based on a connection event occurring as a counselor for the channel allocated with the second type of counseling ticket accesses a chat room corresponding to the second type of counseling ticket, and changing the state of the second type of counseling ticket to a pending state based on a pending event occurring as a pending condition of the second type of counseling ticket is satisfied.

The processor may be configured to, in acquiring the counseling type, set the counseling type to a default value of a predetermined counseling type corresponding to the channel, and control the interfacing object to indicate the counseling type set to the default value on the chat interface.

According to another aspect, there is provided a terminal of a first user using a counseling service interworking with an instant messaging service, including at least one processor configured to receive an input for requesting counseling through a channel of a second user registered in the instant messaging service through a website of the second user, display a chat interface for counseling corresponding to the channel, display an interfacing object indicating a counseling type through the channel on the chat interface, receive control information of the interfacing object created based on the counseling type and a changed state of a counseling ticket created to correspond to the counseling type and control the interfacing object based on the control information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
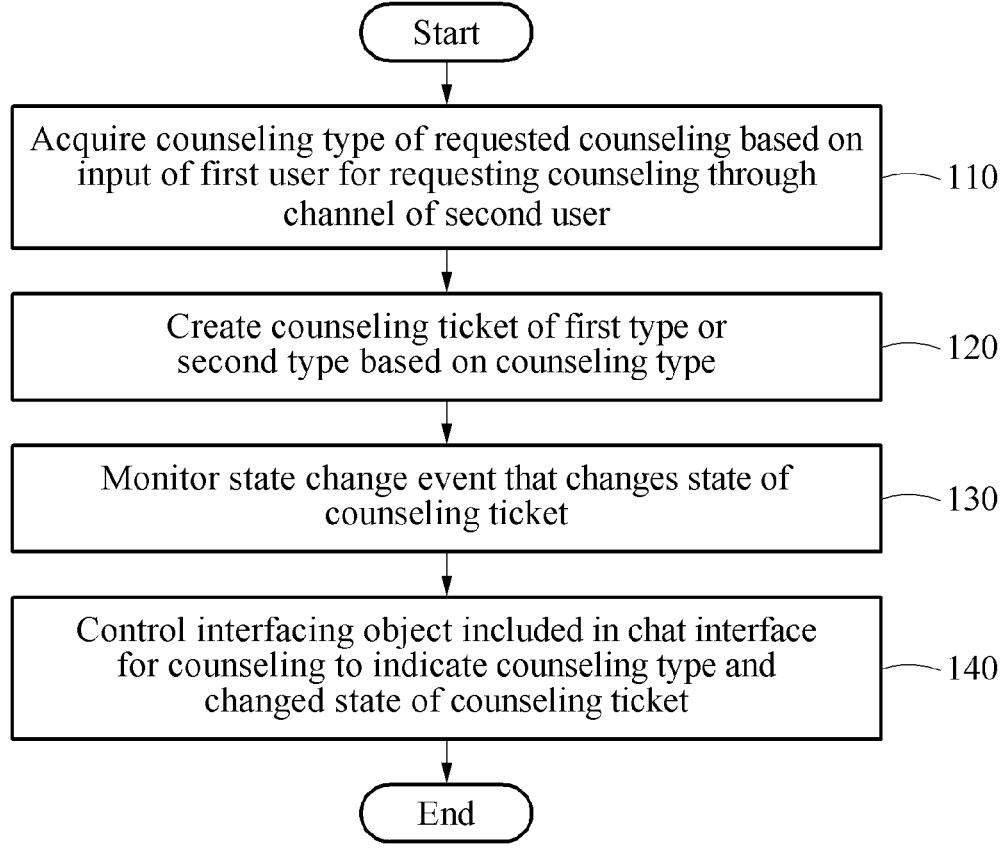
FIG. 1 is a diagram illustrating an operation flowchart of a method of operating a counseling center server interworking with an instant messaging service according to an example embodiment.

Although terms such as first or second may be used to describe various components, these terms should be interpreted only for the purpose of distinguishing one component from another. For example, a first component may be termed a second component, and similarly, a second component may also be termed a first component.

When a component is referred to as being "connected to" another component, it may be directly connected or coupled to the other component, but it should be understood that another component may exist therebetween.

The singular expression includes the plural expression unless the context clearly dictates otherwise. In the specification, terms such as "comprise" or "have" are intended to designate that the described feature, number, step, operation, component, part, or combination thereof exists, and it should be understood that the possibility of presence or addition of one or more other features or numbers, steps, operations, components, parts or combinations thereof is not excluded in advance.

Hereinafter, example embodiments will be described in detail with reference to the accompanying drawings. In describing with reference to the accompanying drawings, the same components are assigned with the same reference numerals regardless of the numerals on the drawings, and overlapping descriptions thereof will be omitted.

FIG. 1 is an operation flowchart illustrating a method of operating a counseling center server interworking with an instant messaging service according to an example embodiment.

Referring to FIG. 1, a method of operating a counseling center server interworking with an instant messaging service according to an example embodiment may include acquiring a counseling type of the requested counseling based on an input of a first user requesting the counseling through a channel of a second user (110), creating a counseling ticket of a first type or a second type based on the counseling type (120), monitoring a state change event that changes the state of the counseling ticket (130), and controlling an interfacing object included in a chat interface for counseling to indicate the counseling type and the changed state of the counseling ticket (140).

The counseling center server according to an example embodiment may correspond to a server that provides a counseling service by interworking with an instant messaging service. The counseling service is a counseling service that uses an instant messenger connected to an instant messaging server for providing an instant messaging service as a counseling medium, and a user may use the counseling service through a registered account or by subscribing to the instant messaging service. The counseling center server and the instant messaging server may be included in a counseling system for providing the counseling service, and a detailed configuration of the counseling system will be described in detail below.

The instant messaging server according to an example embodiment may provide various types of accounts, such as a personal account, a corporate account, or a service account, to use the instant messaging service. The personal account may be an account for a general user, the corporate account may be an account for a specific company, and the service account may be an account for a specific service. The corporate account or the service account may be referred to as a channel.

The counseling service according to an example embodiment may be provided in the form of the counseling through a channel registered in the instant messaging service. Counseling through the channel may refer to the counseling conducted in a chatting manner between the channel and another account that requests the counseling on the channel. For example, the counseling service may be provided in a chatting manner using an instant messenger between a personal account (an individual account) of the first user corresponding to a general user and the channel of the second user corresponding to a specific company or a specific service provider. Hereinafter, the 'counseling center server' may be briefly referred to as a 'server'.

Operation 110 according to an example embodiment may include acquiring a counseling type of the requested counseling based on the input of the first user requesting the counseling through the channel of the second user registered in the instant messaging service. The first user may correspond to a user who has a personal account, a corporate account, or a service account registered in the instant messaging service, and the second user may correspond to a user who has a corporate account or a service account registered in the instant messaging service.

Figure 2A:
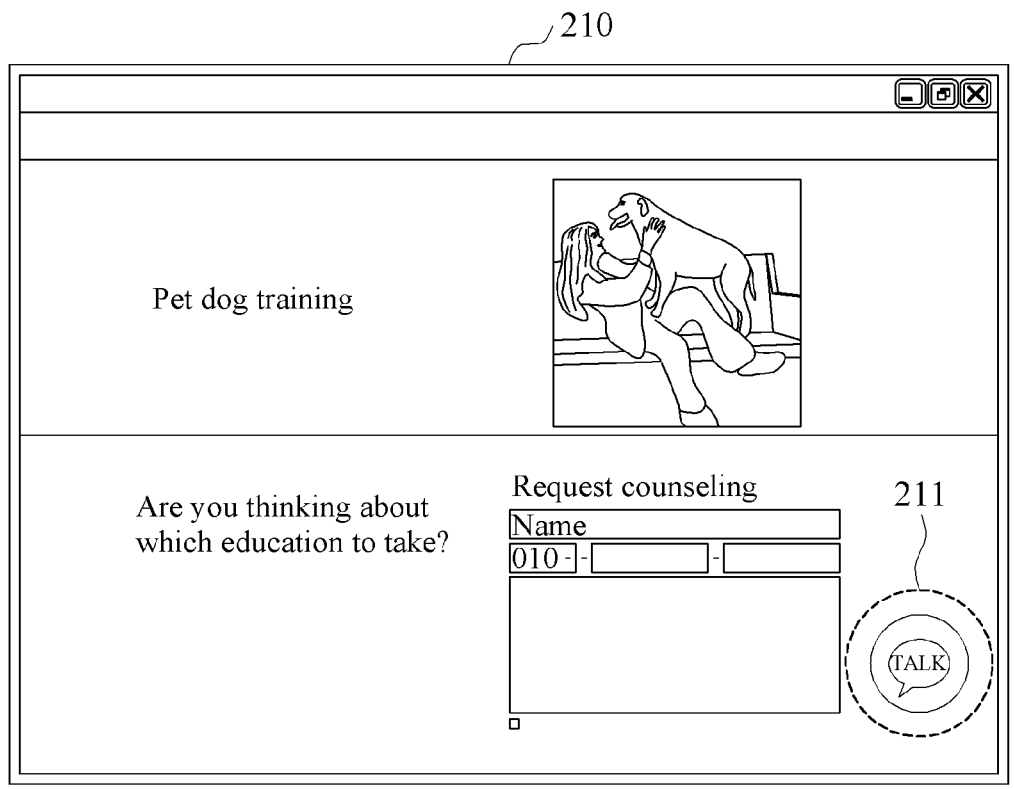
FIGS. 2A and 2B are diagrams illustrating an example embodiment of requesting counseling through a channel of a second user.
Figure 2B:
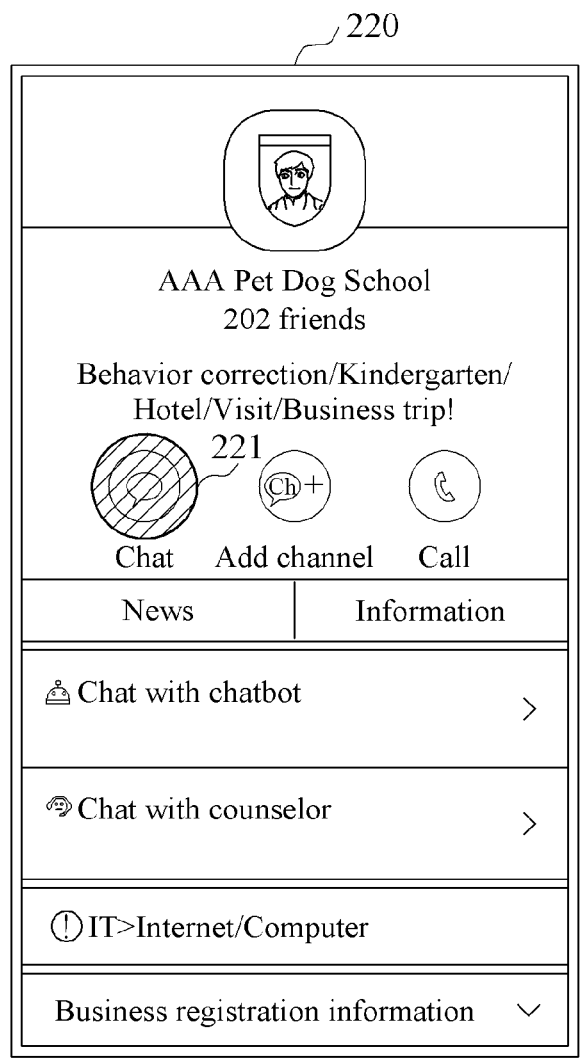

According to an example embodiment, the first user may request the instant messaging server for the counseling through the channel of the second user using a terminal. As an example, the terminal or the first user may be input with a command from the first user for requesting the counseling from a website or application linked to the channel of the second user and transmit a signal for requesting the instant messaging server for the counseling through the channel of the second user. For example, referring to FIG. 2A, the terminal of the first user responses to an input of the first user who selects (e.g., clicks) a button 211 for requesting the counseling on a website 210 linked to the channel of the second user to transmit a signal requesting the counseling through the channel of the second user to the instant messaging server. As another example, the terminal of the first user may request the counseling on the channel of the second user through an interface related to the channel of the second user provided in the instant messenger. For example, referring to FIG. 2B, the terminal of the first user responses to an input of the first user who selects (e.g., clicks) a button 221 for requesting the counseling on an interface 220 related to the channel of the second user provided in the instant messenger to transmit a signal for requesting the counseling through the channel of the second user to the instant messaging server. In this case, the counseling request for the channel of the second user may be transmitted to the counseling center server through the instant messaging server.

The instant messaging server according to an example embodiment may provide the terminal of the first user with a chat interface for counseling corresponding to the channel of the second user in response to the input of the first user requesting the counseling through the channel of the second user. The chat interface for counseling according to an example embodiment may correspond to a user interface for transmitting and receiving a chat message for counseling and displaying the transmitted and received message.

The chat interface for counseling according to an example embodiment may include a chat window corresponding to a virtual chat space in which at least one account or channel participates. The 'virtual chat space' may be referred to as a 'chat room'. According to an example embodiment, the instant messaging server may create a chat room for counseling in which the first user's account and the second user's channel participate in response to an input of the first user requesting the counseling through the channel of the second user and may provide the terminal of the first user with the chat interface corresponding to the created chat room.

According to an example embodiment, when the terminal of the first user who requested the counseling through the channel of the second user is not logged in to the instant messaging service, the instant messaging server may request the terminal of the first user to log in for the instant messaging service. For example, the instant messaging server may call an instant messenger application installed in the terminal of the first user and provide an interface for logging in to an account registered in the instant messaging service. The instant messaging server may provide a chat interface for counseling corresponding to the channel of the second user to the terminal of the first user logged in to the instant messaging service with the account of the first user. Hereinafter, description will be followed by assuming that the terminal of the first user is logged in with the account of the first user registered in the instant messaging service.

Figure 3A:
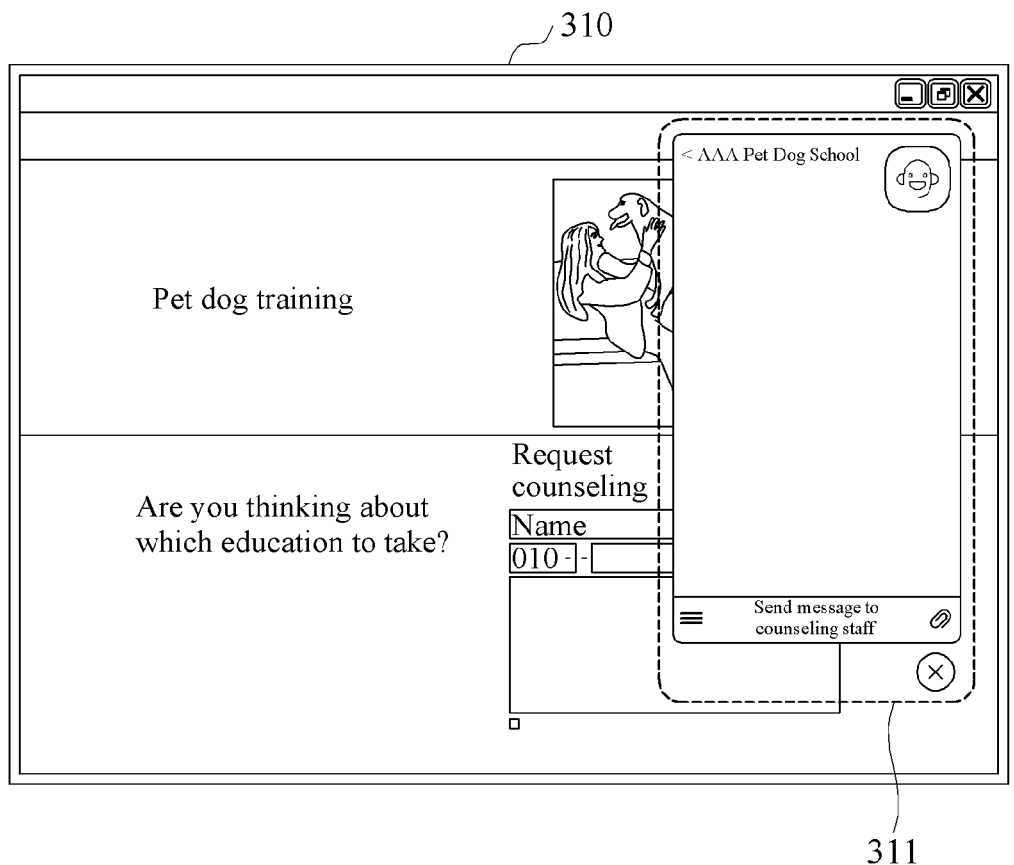
FIGS. 3A and 3B are diagrams illustrating examples of a chat interface provided by a counseling center server according to an example embodiment.
Figure 3B:
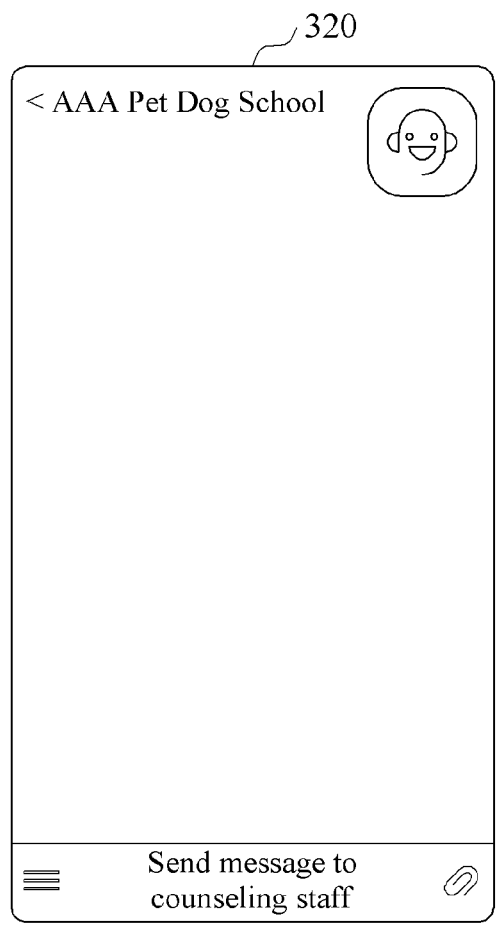

For example, when an input of the first user requesting the counseling is received from the website, the instant messaging server may provide a chat interface in the form of web chatting through the website. For example, referring to FIG. 3A, the instant messaging server responses to a counseling request through a website 310 to provide a chat interface 311 for counseling corresponding to the second channel in the form of web chatting through the website 310. Also, it is possible to provide a chat interface through an instant messenger application by calling the instant messenger application installed in the terminal of the first user. For example, referring to FIG. 3B, the instant messaging server responds to a counseling request through a website or a counseling request through a channel interface of the second user provided in the instant messenger so as to call the instant messenger application installed in the terminal of the first user and provide a chat interface 320 through the called instant messenger application.

According to an example embodiment, the terminal of the first user logged in with an account of the first user accesses the chat room of the second user's channel in which the account of the first user participates through the chat interface, or transmits a message through the chat room of the channel of the second user so as to transmit the input of the first user requesting the counseling. The input of the first user requesting the counseling may be transmitted to the instant messaging server, and the instant messaging server may transmit the same to the counseling center server. In other words, operation 110 according to an example embodiment may include receiving an input of the first user requesting the counseling through the channel of the second user from the instant messaging server.

According to an example embodiment, operations of creating the chat room, requesting login, and providing the chat interface described above as being performed in the instant messaging server may be performed in the counseling center server. In this case, operation 110 according to an example embodiment may include directly receiving, by the counseling center server, an input of the first user requesting the counseling from the terminal that is logged in with the account of the first user.

The counseling type according to an example embodiment may include a first counseling type corresponding to the unmanned counseling and a second counseling type corresponding to the manned counseling depending on a conducting type of the counseling. The first counseling type corresponding to the unmanned counseling is a counseling type that is conducted without a counselor, a natural individual, which may include, for example, a counseling type conducted using a chatbot and/or a counseling type conducted using a database. The unmanned counseling may include counseling types conducted in various ways without counselors of natural individual. However, for convenience of explanation below, described below with an example is the unmanned counseling referred to a counseling type conducted via a previously created chatbot for counseling. The second counseling type corresponding to the manned counseling is a counseling type conducted with a counselor of natural individual. For example, it may include a counseling type that is conducted in a 1:1 chatting manner through a chat interface between the first user who requested the counseling and a counselor linked to a channel of a second user. The counselor linked to the second user's channel may correspond to a user who is able to transmit and receive a chat message regarding the counseling with another user account requesting the counseling using the channel of the second user.

According to an example embodiment, the channel of the second user may be linked with at least one of a counselor and a chatbot previously created for counseling. In other words, the channel of the second user may be linked to both the counselor and the chatbot or may be linked to only one of the counselor and the chatbot. In the case that the counselor is linked to the channel of the second user but not the chatbot, the counseling through the channel of the second user may be conducted via the manned counseling. In the case that the chatbot is linked to the channel of the second user but not the counselor, the counseling through the channel of the second user may be conducted via the unmanned counseling. When the channel of the second user is linked to both the counselor and the chatbot, counseling through the channel of the second user may support both the manned counseling and the unmanned counseling. Accordingly, when the channel of the second user is linked to both the counselor and the chatbot, the counseling type may be determined to be one of the manned counseling and the unmanned counseling prior to the initiation of the counseling, and the counseling type may be changed even while the counseling is being conducted. For example, the counseling type through the channel of the second user may be selected as either one of the manned counseling and the unmanned counseling by the first user, and the counseling type may be determined according to a predetermined criterion corresponding to the channel of the second user.

According to an example embodiment, an input of the first user requesting the counseling on a channel may include information indicating the type of counseling. For example, the input of the first user for requesting the counseling on a channel may include an input for requesting chatting with a chatbot linked to the channel or an input for transmitting a message by designating a chatbot linked to the channel as a recipient. In this case, the input of the first user may correspond to an input for requesting the unmanned counseling for the channel. Also, for example, the input of the first user requesting the counseling on a channel may include an input for requesting chatting with a counselor linked to the channel or an input for transmitting a message by designating a counselor linked with the channel as a recipient. In this case, the input of the first user may correspond to an input for requesting the manned counseling for the channel.

According to an example embodiment, a server may transmit the counseling type acquired in operation 110 to the instant messaging server, and the instant messaging server may add an interfacing object indicating the counseling type to the chat interface.

The interfacing object is a configuration set to interact with a user within an interface, and may include, for example, an object that may receive an input from a user while providing the user with specific information (e.g., visual information, etc.). The interfacing object may include a button created to make a predetermined function performed (e.g., switching to another screen, etc.) by an input of user selection (e.g., click).

Figure 4A:
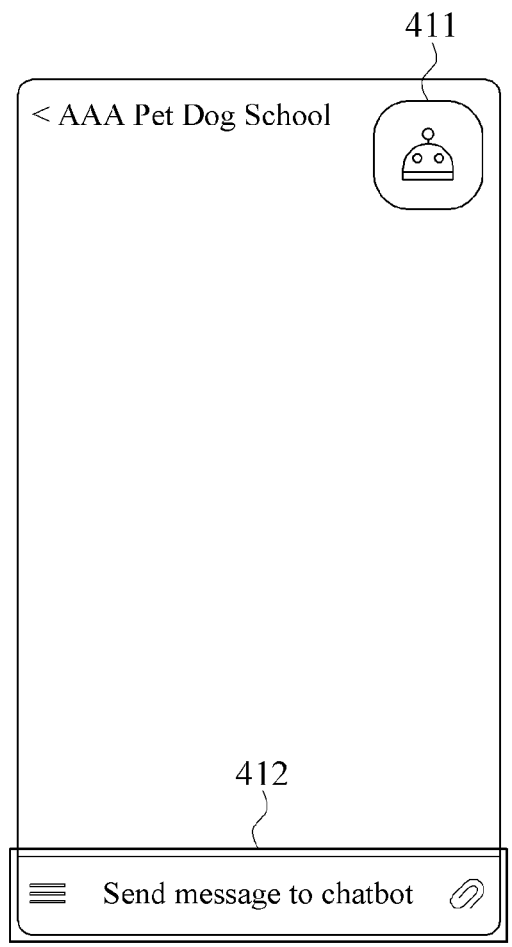
FIG. 4A to 4C are diagrams illustrating an example of an interfacing object displayed on a chat interface according to an example embodiment.
Figure 4B:
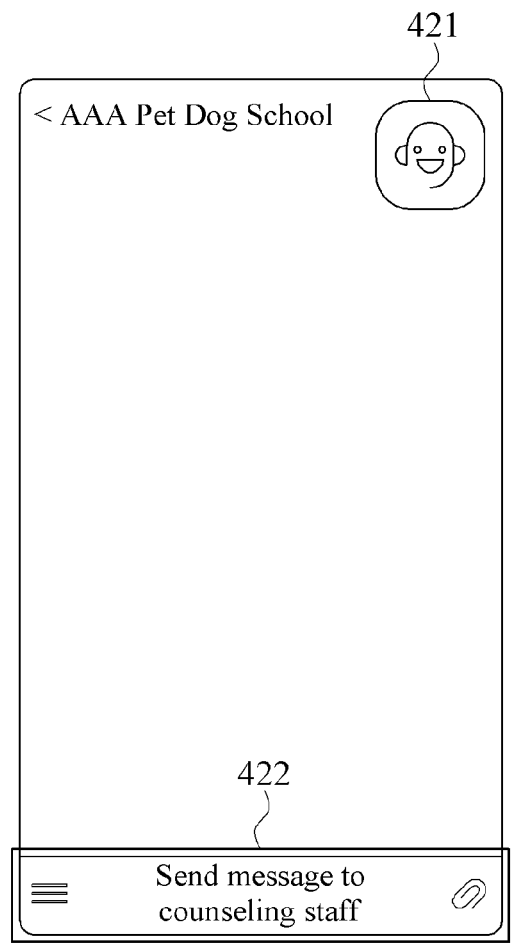

The interfacing object according to an example embodiment may include a function of displaying a counseling type. For example, referring to FIGS. 4A and 4B, the chat interface may include interfacing objects 411 and 421 that visually display the counseling type, and a visual sign of the interfacing object 411 corresponding to the first counseling type shown in FIG. 4A may be distinguished from that of the interfacing object 421 corresponding to the second counseling type shown in FIG. 4B. Also, referring to FIG. 4A, in order to inform the user that the counseling is the first counseling type conducted with the chatbot, the text saying 'Send a message to the chatbot' may be displayed in an input window 412 of the chat message. Referring to FIG. 4B, in order to inform the user that the counseling is the second counseling type conducted with a counselor, the text saying 'Send a message to the counselor' may be displayed in an input window 422 of the chat message.

Figure 4C:
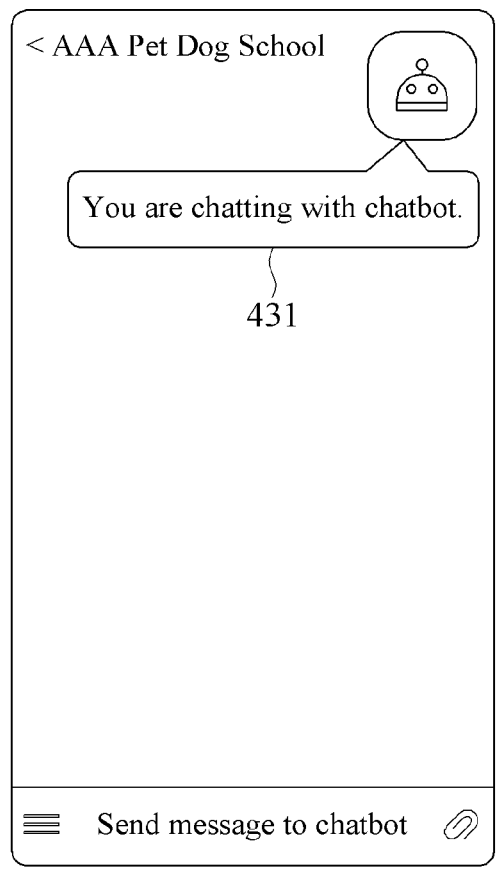

The interfacing object according to an example embodiment may include a guide comment corresponding to the visual sign. As will be described in detail below, the guide comment may include information for explaining the current counseling state to the user, and may be controlled to be changed to text of different contents depending on the state of counseling. For example, referring to FIG. 4C, the guide comment 431 included in the interfacing object may be set to be displayed as a default on the chat interface. Also, for example, when performing a predetermined input (e.g., mouseover (hover)) to the interfacing object 411 shown in FIG. 4A, a guide comment 431 may be set to be added as shown in FIG. 4C.

According to an example embodiment, the terminal of the first user may transmit, to the server, a signal for requesting switch between the manned counseling and the unmanned counseling. The request for switching between the manned counseling and the unmanned counseling may correspond to a command for requesting the server to switch the counseling type to the second counseling type if the current counseling type is the first counseling type corresponding to the unmanned counseling, and may correspond to a command for requesting the server to switch the counseling type to the first counseling type if the current counseling type is the second counseling type corresponding to the manned counseling.

Figure 5:
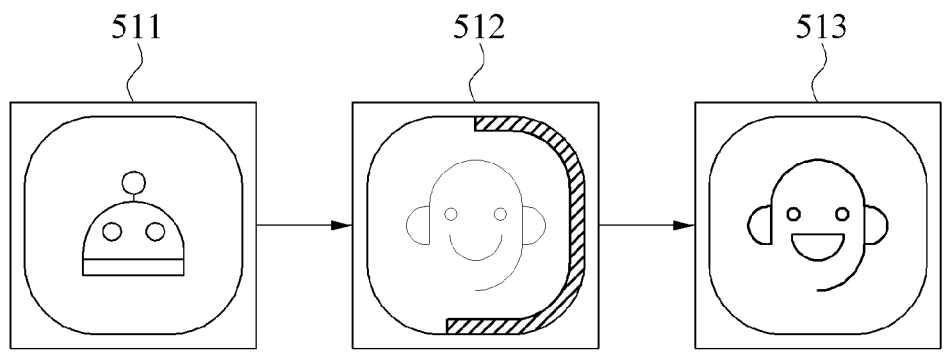
FIG. 5 is a diagram illustrating an example in which an interfacing object is changed in accordance with switch of a counseling type according to an example embodiment.

For example, referring to FIG. 5, an interfacing object 511 corresponding to the current counseling type may be displayed on the chat interface if the current counseling type is the first counseling type corresponding to the unmanned counseling. When a request for switching between the manned counseling and the unmanned counseling is received from the first user, the first counseling type corresponding to the unmanned counseling may be switched to the second counseling type corresponding to the manned counseling, and an interfacing object 513 corresponding to the counseling type switched to the second counseling type may be displayed on the chat interface. As an example, in order to explicitly indicate that the counseling type is to be switched, an interfacing object 512 indicating that the counseling type is being switched may be displayed while an operation of switching from the first counseling type to the second counseling type is performed. As another example, a visual sign indicating a time to be connected with a counselor may be added to the interfacing object while an operation for switching from the first counseling type to the second counseling type is performed.

According to an example embodiment, the request for switching between the manned counseling and the unmanned counseling may be received via the interfacing object. In other words, the interfacing object may include a function of requesting the switch between the manned counseling and the unmanned counseling. For example, referring to FIG. 5, by selecting (e.g., clicking) the interfacing object 511 corresponding to the first counseling type, the user may transmit a request for switching between the manned counseling and the unmanned counseling to the server, and the server may switch the first counseling type to the second counseling type in response to the request. Conversely, by selecting (e.g., clicking) the interfacing object 513 corresponding to the second counseling type, the user may transmit a request for switching between the manned counseling and the unmanned counseling to the server. In this case, the server may switch the second counseling type to the first counseling type in response to the request.

Figure 6:
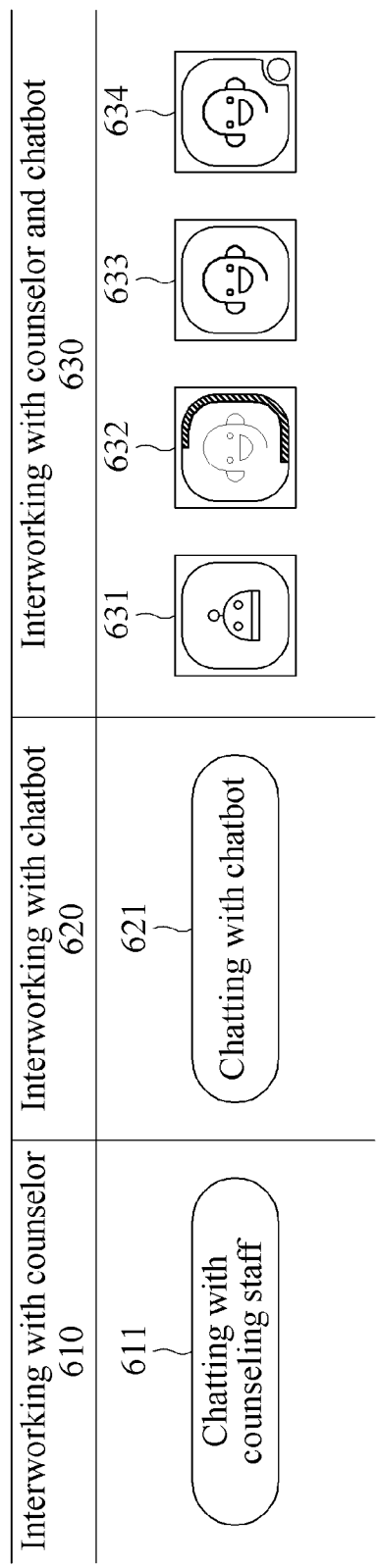
FIG. 6 is a diagram illustrating an example of an interfacing object corresponding to a linkage relationship between a channel, a counselor, and a chatbot according to an example embodiment.

As described above, the channel of the second user may be linked to both the counselor and the chatbot, or may be linked to only one of the counselor and the chatbot. The interfacing object according to an example embodiment may include a function of requesting switch between the manned counseling and the unmanned counseling when both the counselor and the chatbot are linked to the channel of the second user, and may not include the function of requesting switch between the manned counseling and the unmanned counseling when only one of the channel of the second user is linked to the channel of the second user. The interfacing object that the channel is linked with both the counselor and the chatbot and the interfacing object that the channel is linked with only one of the counselor and the chatbot may be displayed differently. For example, referring to FIG. 6, when the channel is linked to any one of the counselor and the chatbot 610 or 620, an interfacing object 611 or 621 is displayed depending on the counseling type to provide the first user with information on the counseling type. On the other hand, when the channel is linked with both the counselor and the chatbot 630, an interfacing object 631 indicating the first counseling type or a plurality of interfacing objects 632 to 634 indicating the second counseling type is displayed depending on the counseling type to provide the first user with information on the counseling type. As will be described in detail below, any one of the plurality of interfacing objects 632 to 634 indicating the second counseling type may be displayed based on the changed state of the second type of counseling ticket. According to an example embodiment, the interfacing objects 631 to 634 displayed when the channel is linked to both the counselor and the chatbot may include a function of receiving an input from the user like a button. As an example, in response to an input for selecting (e.g., clicking) an interfacing object of a user, switching between the first counseling type and the second counseling type may occur. On the other hand, when the channel is linked with any one of the counselor and the chatbot, the interfacing object may not include a function of receiving an input from the user.

According to an example embodiment, acquiring of a counseling type (110) may include setting the counseling type to a default value of a predetermined counseling type corresponding to the channel of the second user and controlling the interfacing object so as to instruct the counseling type set to the default value on the chatting interface. For example, the default value for the counseling type may be predetermined as a first counseling type corresponding to the unmanned counseling. The operation of controlling the interfacing object according to an example embodiment will be described in detail below.

Operation 120 according to an example embodiment may include creating a first type of counseling ticket when the counseling type acquired in operation 110 is the first counseling type corresponding to the unmanned counseling, and creating a second type of counseling ticket when the counseling type is the second counseling type corresponding to the manned counseling. The counseling ticket is a unit of counseling objectified in the server, and the counseling ticket may correspond to a session for counseling between a specific user and a counselor or a chatbot linked to a specific channel. The counseling between a specific user and a specific channel is objectified as a counseling ticket to be stored in the server, and the counseling ticket may include a chat log between a specific user and a specific channel transmitted and received during the counseling.

As an example, the counseling ticket may be created to correspond to the chat room as the first user who requested the counseling inputs a chat message in the chat room of the channel through the chat interface for counseling. In the case that the counseling type at the time of inputting the chat message of the first user is the first counseling type corresponding to the unmanned counseling, a first type of counseling ticket, which is a counseling ticket corresponding to the chatbot, may be created. In the case that the counseling type at the time of inputting the chat message of the first user is the second counseling type corresponding to the manned counseling, a second type of counseling ticket, which is a counseling ticket corresponding to the counselor, may be created.

As another example, the counseling ticket may be created in response to an input of the first user selecting an interfacing object displayed on the chat interface for counseling. As described above, the input for selecting the interfacing object may correspond to a request for switching of the counseling type. When the counseling type is switched to the first counseling type by the input for selecting the interfacing object, the first type of counseling ticket may be created, and when the counseling type is switched to the second counseling type by an input for selecting the interfacing object, a second type of counseling ticket may be created.

According to an example embodiment, the state of the counseling ticket may be changed according to a state change event related to the counseling ticket that occurs in the course of the counseling. For example, the state change event may include at least one of a creation event, an end event, a connection event, and a pending event, and the state of the counseling ticket may be changed based on the occurrence of the state change event.

According to an example embodiment, a state change event that may occur with respect to the counseling ticket may vary depending on the type of the counseling ticket, and the state in which the counseling ticket may take may also vary. In other words, the type of state change event that may occur with respect to the first type of counseling ticket and the type of state change event that may occur with respect to the second type of counseling ticket may be different from each other. Also, the type of state that the first type of counseling ticket may take and the type of state that the second type of counseling ticket may take may be different from each other.

According to an example embodiment, a creation event and/or an end event may occur with respect to the first type of counseling ticket, and the state of the first type of counseling ticket in which the creation event has occurred may correspond to a progress state, and the state of the first type of counseling ticket in which the end event has occurred may correspond to an end state. A creation event, a connection event and/or an end event may occur with respect to the second type of counseling ticket. The state of the second type of counseling ticket that the creation event occurred may correspond to a waiting state, the state of the second type of counseling ticket that the connection event occurred may correspond to the progress state, and the state of the first type of counseling ticket that the end event occurred may correspond to the end state. The connection event may correspond to an event that occurs when an account of a counselor allocated with the counseling ticket accesses a chat room corresponding to the counseling ticket or transmits a message through the chat room corresponding to the counseling ticket.

According to an example embodiment, the waiting state for the second type of counseling ticket may be divided into an unallocated state and the waiting state depending on the occurrence of an allocation event. In other words, the second type of counseling ticket may correspond to the unallocated state when the creation event occurs, and may correspond to the waiting state when an allocation event that the counseling ticket is allocated to a specific counselor occurs.

According to an example embodiment, when the end condition for the counseling ticket created by operation 120 is satisfied, an end event related to the created counseling ticket may occur. The end condition may be satisfied when a command for the end is received from the user and/or when there is no response from the user for a certain period of time. A connection event may occur when the created second type of counseling ticket is allocated to a counselor so that the counselor accesses a chat room corresponding to the second type of counseling ticket or when a message is transmitted through a chat room corresponding to the counseling ticket. The second type of counseling ticket may be changed to the progress state by the occurrence of the connection event.

According to an example embodiment, the second type of counseling ticket may take the pending state. When the counselor allocated with the second type of counseling ticket requests hold for the counseling ticket, a pending event for the counseling ticket may occur, and the counseling ticket may be changed to the pending state.

Operation 130 according to an example embodiment may include monitoring a state change event for changing the state of the counseling ticket and changing the state of the counseling ticket based on the occurred state change event. In other words, the server may monitor the state change event for the counseling ticket to detect the occurrence of the state change event and change the state of the counseling ticket based on the occurred state change event.

As an example, the monitoring of the state change event (130) may further include changing the state of the counseling ticket to the end state based on the end event that occurs as the end condition for the counseling ticket is satisfied. In other words, the server may determine whether the end condition for the counseling ticket is satisfied to detect the occurrence of the end event for the counseling ticket, and change the state of the counseling ticket to the end state based on the end event. The end condition may be predetermined in correspondence with the channel. For example, the end condition may include a condition in which the first user requests an end of the counseling, a condition in which the duration of the counseling ticket exceeds a predetermined threshold value, a condition in which a chat message has not been received from the first user for a certain period of time, a condition in which a request for switching between the manned counseling and the unmanned counseling is received from the first user, or various combinations thereof.

As another example, the monitoring of the state change event (130) may further include changing the state of the second type of counseling ticket to the progress state based on a connection event occurring when a counselor for the channel allocated with the second type of counseling ticket accesses the chat room corresponding to the second type of counseling ticket or transmits a message through the chat room corresponding to the counseling ticket. In other words, the server may determine whether the counselor is connected to the chat room corresponding to the second type of counseling ticket to detect the occurrence of the connection event related to the counseling ticket and may change the state of the counseling ticket to the progress state. The progress state of the counseling ticket may refer to the state in which the counseling ticket is allocated to a counselor linked to the channel of the second user, and the counselor may chat with the first user for counseling by accessing the chat room of the channel for counseling. For example, the connection of the counselor may be determined whether the counselor transmitted a chat message through the chat room and may also be determined whether the counselor received the chat message transmitted from the first user through the chat room.

As another example, the monitoring of the state change event (130) may further include changing the state of the second type of counseling ticket to the pending state based on the pending event that occurs when the pending condition for the second type of counseling ticket is satisfied. In other words, by determining whether the holding condition for the second type of counseling ticket is satisfied, the server may detect the occurrence of the pending event for the counseling ticket and change state of the counseling ticket to the pending state. The counselor allocated with the second type of counseling ticket may request the server to hold the counseling ticket, and when the request for hold from the counselor is valid, the pending condition of the counseling ticket may be satisfied. The counseling ticket in the pending state may not be changed to the end state even if the end condition is satisfied. The counseling ticket in the pending state may be changed from the pending state to another state based on a pending release request from a counselor or a pending release condition such as a case that the pending state continues for a certain period of time or longer.

Operation 130 according to an example embodiment may further include providing the first user with information on the change of the state of the counseling ticket through the chat interface when the state of the counseling ticket is changed due to occurrence of the state change event for the counseling ticket. When the state of the counseling ticket is changed, the server may provide the first user with information on the change of the state of the counseling ticket by transmitting a chat message notifying that the state of the counseling ticket is changed through the chat interface.

Figure 7:
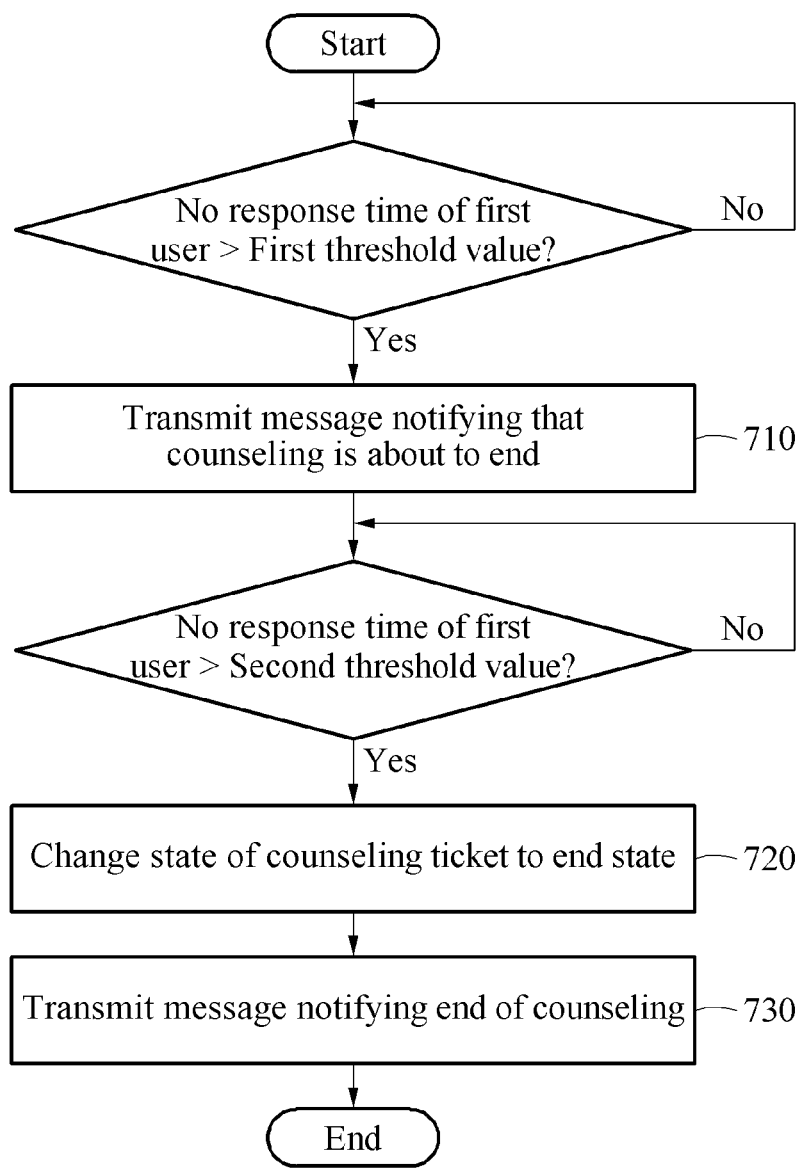
FIG. 7 is a diagram describing an example embodiment of notifying information on a change in a state of a counseling ticket through a message according to an example embodiment.

For example, referring to FIG. 7, when the end condition for the counseling ticket includes a condition in which no response time of the first user exceeds a predetermined second threshold value, the server may change the state of the counseling ticket to the end state (720) and may transmit a message informing the first user of the end of the counseling through the chat interface (730) in order to inform the first user that the state of the counseling ticket is changed to the end state. According to an example embodiment, operation 720 and operation 730 may be performed simultaneously, or operation 720 may be performed after operation 730 is performed first. For example, after the operation 730 of transmitting a message informing the first user of the end of the counseling is first performed, the operation 720 of changing the state of the counseling ticket to the end state may be performed. According to an example embodiment, the server presets a first threshold value that is smaller than the second threshold value regarding the end condition so as to transmit a message informing the end of the counseling (710) when no response time of the first user exceeds the first threshold value so as to notify the first user that the state of the counseling ticket is about to be changed to the end state.

Operation 140 according to an example embodiment may include controlling the interfacing object based on whether the counseling type is switched and whether the state of the counseling ticket is changed upon occurrence of a state change event.

According to an example embodiment, the operation of controlling the interfacing object may include the operation of transmitting a signal for controlling the interface object to the instant messaging server. As an example, the operation of controlling the interfacing object may include the operation of transmitting the switched counseling type and/or the changed state of the counseling ticket to the instant messaging server. The instant messaging server may receive the switched counseling type and/or the changed state of the counseling ticket so as to change the interfacing object to indicate the switched counseling type and/or the changed state of the counseling ticket.

As described above, the channel of the second user may be linked to both the counselor and the chatbot. In this case, the controlling of the interfacing object (140) may further include switching the counseling type based on the request for switching between the manned counseling and the unmanned counseling received from the first user through the chat interface and controlling the interfacing object to correspond to the switched counseling type. For example, when the counseling type is switched from the first counseling type to the second counseling type upon the request for switching between the manned counseling and the unmanned counseling received from the first user, the server may notify the instant messaging server that the counseling type is switched to the second counseling type. In addition, the instant messaging server may change the interfacing object included in the chat interface to indicate the second counseling type.

According to an example embodiment, the counseling state may be determined based on the counseling type and the state of the counseling ticket. The counseling state may include a plurality of counseling states switched based on the counseling type and the state of the counseling ticket. The counseling state may be switched to another counseling state as the counseling type is switched or the state of the counseling ticket is changed. For example, the counseling state may include a first state and a second state corresponding to the first counseling type. When the counseling ticket is changed to the creation state upon occurrence of an event that the first type of counseling ticket is created, the first state may be switched to the second state. When the counseling ticket is changed to the end state upon occurrence of an event that the first type of counseling ticket is ended, the second state may be switched to the first state.

According to an example embodiment, the interfacing object may correspond to each counseling state, and as the counseling state is switched, the interfacing object may be changed to an interfacing object corresponding to the switched counseling state. In other words, operation 140 according to an example embodiment may include switching the counseling state based on at least one of the switch of the counseling type and the change of the state of the counseling ticket, and transmitting a signal for controlling the interfacing object based on the switched counseling state. As an example, based on a signal for controlling the interfacing object, the interfacing object may perform at least one of operations of changing a visual sign included in the interfacing object, adding a visual effect to the interfacing object, and changing the interfacing object to make the interfacing object display the switched counseling state such as an operation of changing the guide comment included in the interfacing object.

Figure 8:
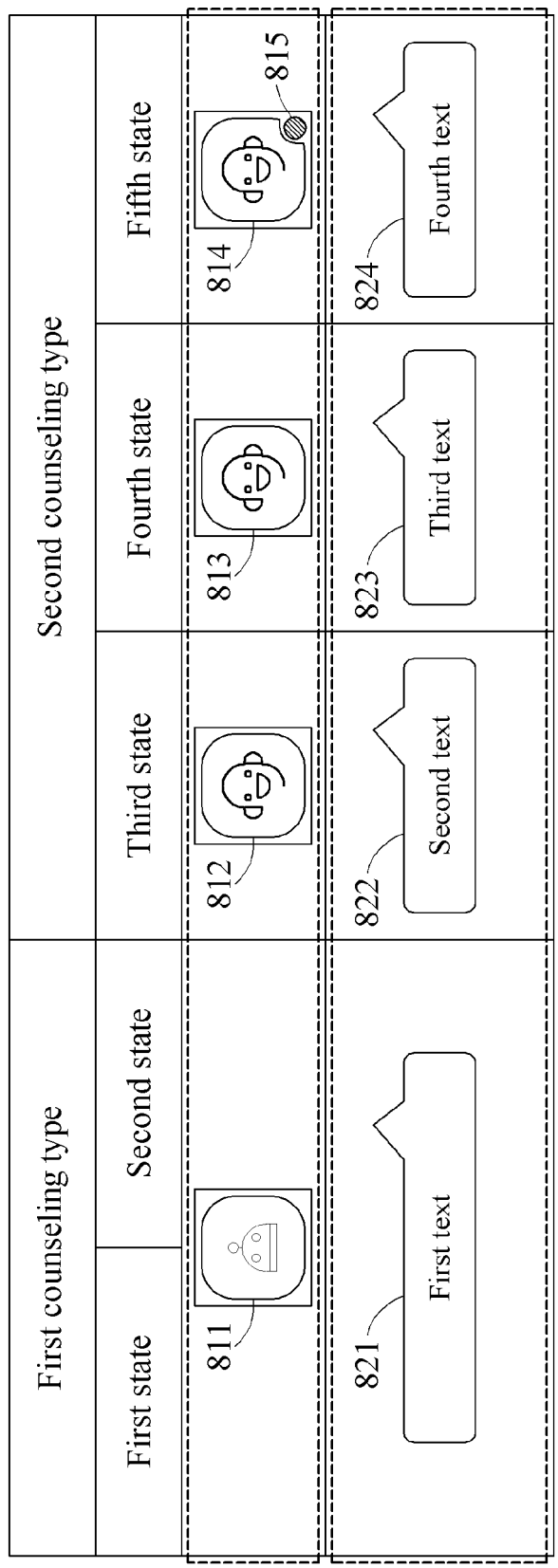
FIG. 8 is a diagram illustrating an example of a visual sign and a guide comment of an interfacing object corresponding to a counseling state according to an example embodiment.

For example, referring to FIG. 8, the counseling state may include first to fifth states, the first state and the second state may correspond to the counseling state corresponding to the first counseling type, and the third state to fifth state may correspond to counseling states corresponding to the second counseling type. The interfacing object corresponding to each counseling state may include visual signs 811 to 814 corresponding to each counseling state and guide comments 821 to 824 shown with a mouseover effect. The visual sign 811 of the interfacing objects corresponding to the first to second states corresponding to the first counseling type may be identical to each other, and visual signs 812 to 814 of the interfacing objects corresponding to the third to fifth states corresponding to the second counseling type may be identical to each other. For example, when switched from the counseling state (first state or second state) corresponding to the first counseling type to the counseling state (third state, fourth state, or fifth state) corresponding to the second counseling type, or when switched from the counseling state corresponding to the second counseling type to the counseling state corresponding to the first counseling type, the controlling of the interfacing object may include changing the visual sign included in the interfacing object (e.g., changing between the visual sign 811 and the visual sign 812). As another example, when switched from the third state to the fourth state, the controlling of the interfacing object may include changing the guide comment included in the interfacing object (e.g., changing from the second text to the third text). As another example, when switched from the fourth state to the fifth state, controlling of the interfacing object may include adding a visual effect to the interfacing object (e.g., adding a figure 815).

According to an example embodiment, the interfacing object may not be changed even if the counseling state is changed. For example, referring to FIG. 8, the interfacing object indicating the first state and the interfacing object indicating the second state may be set identically. In this case, the counseling state is switched from the first state to the second state, or the interfacing object may not be changed when the second state is changed to the first state.

FIG. 9A to FIG. 11 are diagrams illustrating a method of switching the counseling state based on at least one of a counseling ticket type and a changed state of a counseling ticket according to an example embodiment.

For the description of FIGS. 9A to 11, as shown in FIG. 8, an example embodiment how the counseling state is switched will be described with an example in which the counseling state corresponding to the first counseling type includes the first to second states while the counseling state corresponding to the second counseling type includes the third to the fifth states. More specifically, the counseling state corresponding to the first counseling type corresponding to the unmanned counseling may include two counseling states classified into a first state corresponding to a state before initiation of the unmanned counseling and a second state corresponding to a state during the unmanned counseling. The counseling state corresponding to the second counseling type corresponding to the manned counseling may include three counseling states that are classified into a third state corresponding to the state before initiation of manned counseling, a fourth state corresponding to the waiting state for the manned counseling, and a fifth state corresponding to the state during the manned counseling. The first to fifth states correspond to an example of the counseling state to describe the method of providing a counseling service in detail with a specific example, and are not intended to limit the counseling state.

Figure 9A:
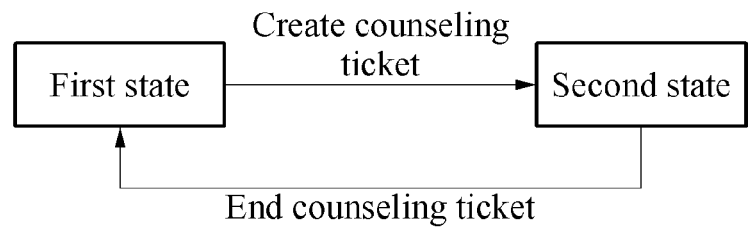
FIG. 9A to FIG. 11 are diagrams describing a method of switching a counseling state based on at least one of a counseling type and a changed state of a counseling ticket according to an example embodiment.

FIG. 9A is a diagram illustrating switch of a counseling state corresponding to the unmanned counseling according to an example embodiment.

Referring to FIG. 9A, when a chat message input is received from the first user in a first state corresponding to the state before initiation of the unmanned counseling before the counseling ticket is created, the server may create the counseling ticket in response to the chat message input. The first state, the counseling state at the time when chat message is input, corresponds to the first counseling type, and thus the created ticket may correspond to the first type of counseling ticket corresponding to the unmanned counseling according to the first counseling type. The counseling state may be switched from the first state to the second state in response to creation of the counseling ticket. In other words, the server may detect that the counseling ticket creation event has occurred as the counseling ticket is created, and change the counseling state from the first state to the second state based on the changed state of the counseling ticket due to the creation event for the counseling ticket.

When the end condition for the counseling ticket is satisfied in the second state that the first type of counseling ticket is maintained, the server may end the counseling ticket. In response to the occurrence of the end event for the counseling ticket, the counseling state may be switched from the second state to the first state. In other words, the server may detect that the end event for the state of the counseling ticket occurred as the end condition for the counseling ticket is satisfied, and switch the counseling state from the second state to the first state based on the end state of the counseling ticket according to the end event for the counseling ticket.

Figure 9B:
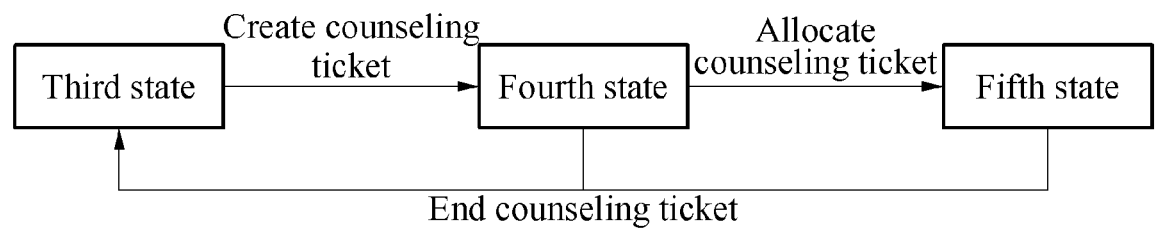

FIG. 9B is a diagram illustrating switch of a counseling state corresponding to the manned counseling according to an example embodiment.

Referring to FIG. 9B, when the chat message input of the first user is received in the third state corresponding to the state before the initiation of the manned counseling before the counseling ticket is created, the server may create a counseling ticket in response to the chat message input. The third state, the counseling state at the time when the chat message is input, corresponds to the second counseling type, and thus the created counseling ticket may correspond to the second type of counseling ticket corresponding to the manned counseling according to the second counseling type. The counseling state may be switched from the third state to the fourth state in response to creation of the counseling ticket. When the counseling ticket is changed to the end state in the fourth state in which the second type of counseling ticket is created, the counseling ticket may be ended and the counseling state may be switched to the third state that is a state before the counseling ticket is created.

The fourth state may correspond to a state in which the second type of counseling ticket is created but not connected to a counselor. When the state of the counseling ticket is change to the progress state as a counselor allocated with the second type of counseling ticket in the fourth state accesses the chat room corresponding to the counseling ticket or first transmits a message through the chat room corresponding to the counseling ticket, the counseling state may be switched from the fourth state to the fifth state. In other words, the server may monitor whether the counselor is connected to the chat room corresponding to the counseling ticket, and as the counselor accesses the chat room corresponding to the counseling ticket, the server may recognize that the state of the counseling ticket is changed to the progress state. The server may switch the counseling state from the fourth state to the fifth state based on the progress state of the counseling ticket. When the counseling ticket is changed to the end state in the fourth state, the counseling ticket is ended, and the counseling state may be switched to the third state that is a state before the counseling ticket is created.

Figure 10:
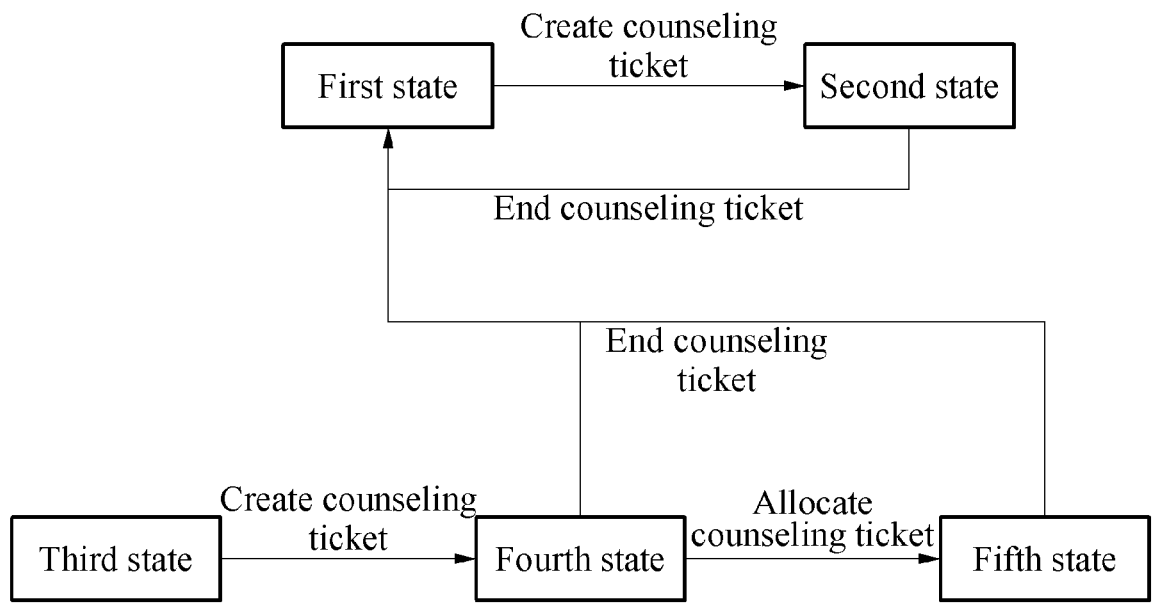

FIG. 10 is a diagram illustrating switch of a counseling state when a default value of a counseling state is set as a first state according to an example embodiment.

According to an example embodiment, a default value of the counseling state may be predetermined. The initial counseling state may be set to a default value, and when an end condition is satisfied, the counseling state may be switched to the default value.

Referring to FIG. 10, when the state of the counseling ticket is changed to the end state in the second state, the fourth state, or the fifth state, the counseling state may be switched to the first state corresponding to the default value. The third state corresponds to a state before the counseling ticket is created, and a change in the state of the counseling ticket may not occur since the counseling ticket and the state of the counseling ticket do not exist. Although not shown in FIG. 10, the switch to the third state may occur when there is a request for switching between the manned counseling and the unmanned counseling in the first state or the second state.

Figure 11:
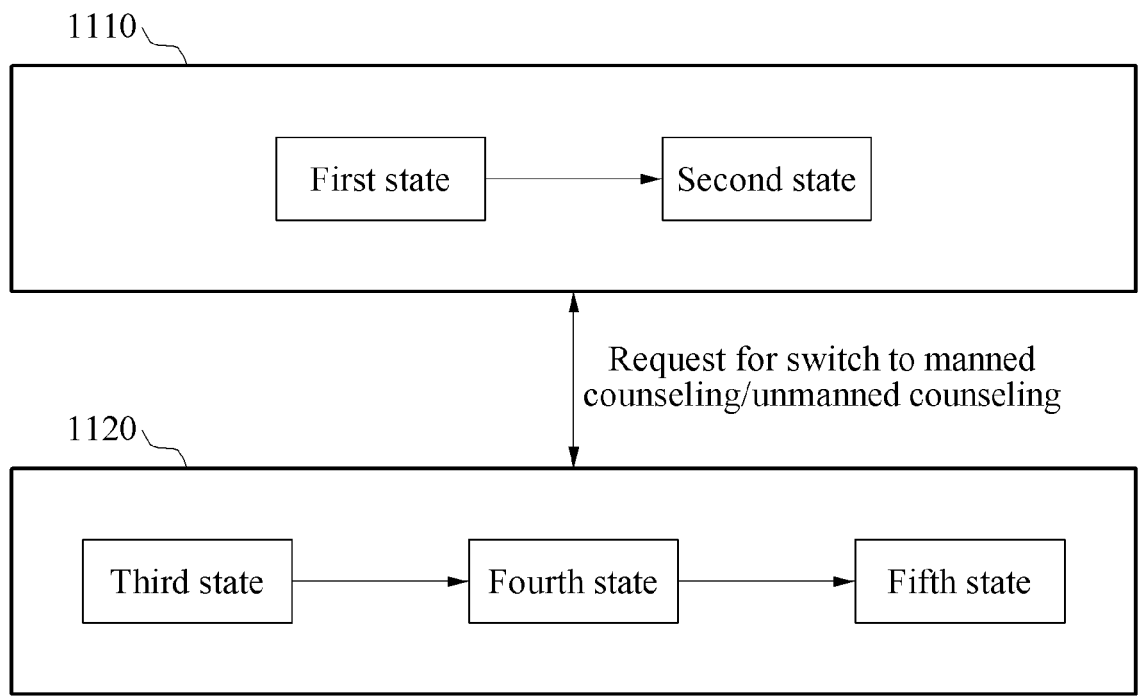

FIG. 11 is a diagram illustrating switch of a counseling state in response to a request for switching between the manned counseling and the unmanned counseling according to an example embodiment.

As described above, a user who requested the counseling may request the server to switch between the manned counseling and the unmanned counseling. Hereinafter, a request for 'switch between the manned counseling and the unmanned counseling' may be briefly referred to as a 'switch request'. In the case that the switch request is received from the user, when the counseling state at the time the switch request is input corresponds to one of the counseling states 1110 (the first state or the second state) of the first counseling type, and when the state is switched to any one of the counseling states 1120 (the third state, the fourth state, or the fifth state) of second counseling types while the counseling state at the time the switch request is input is one of counseling states 1120 (the third state, the fourth state, or the fifth state) of the second counseling type, the state may be switched to any one of the counseling states 1110 (the first state or the second state) of the first counseling types.

According to an example embodiment, the counseling state switched by the switch request may be determined by the state before the counseling ticket is created. For example, when there is the switch request in one of the counseling states (the first state or the second state) among the counseling states 1110 of the first counseling type, the counseling state may be switched to the third state which is a state before the second type of counseling ticket is created among the counseling states 1120 of the second counseling type. When there is the switch request in one of the counseling states (the third state, the fourth state, or the fifth state) among the counseling states 1120 of the second counseling type, the counseling state may be switched to the first state which is a state before the first type counseling ticket is created among the counseling states 1110 of the first counseling type. According to an example embodiment, the counseling state switched by the switch request may be determined according to a predetermined condition corresponding to the channel.

According to an example embodiment, the switch request input after the counseling ticket is created may correspond to the end condition for the counseling ticket. For example, when the switch request is received in the server in the second state corresponding a state after the first type of counseling ticket is created, the first type of counseling ticket is changed to the end state, and the counseling state may be switched from the second state to the third state based on the switch request and the end state of the first type of counseling ticket. For another example, when the switch request is received in the server in the fourth state or the fifth state, the second type of counseling ticket is changed to the end state, and the counseling state may be changed from the fourth state or the fifth state to the first state based on the switch request and the end state of the second type of counseling ticket.

Figure 12:
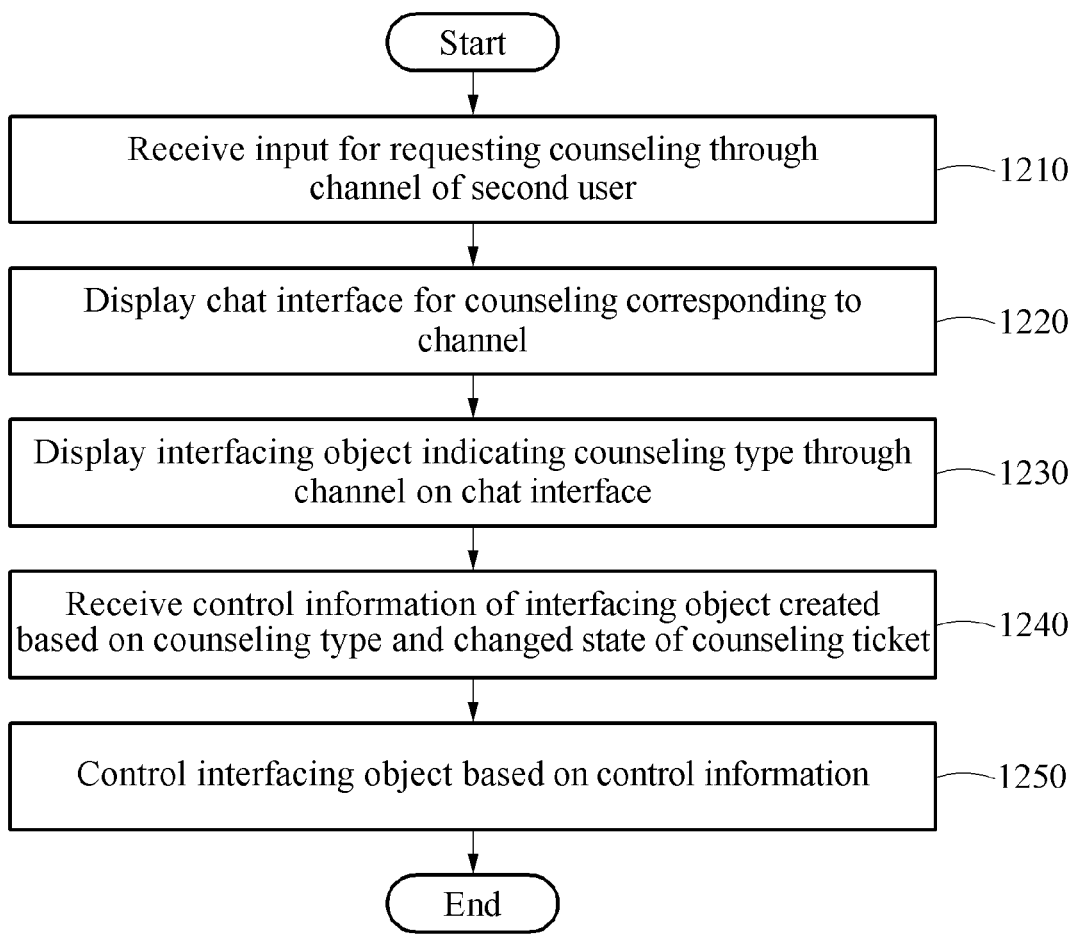
FIG. 12 is a flowchart illustrating a method of operating a terminal of a first user using a counseling service interworking with an instant messaging service according to an example embodiment.

FIG. 12 is a flowchart illustrating a method of operating a terminal of a first user using a counseling service interworking with an instant messaging service according to an example embodiment.

Referring to FIG. 12, the method of operating a terminal of a first user using a counseling service interworking with an instant messaging service according to an example embodiment may include receiving an input for requesting the counseling through a channel of a second user (1210), displaying a chat interface for counseling corresponding to the channel (1220), displaying the interfacing object indicating a counseling type on the chat interface through the channel (1230), receiving control information of the interfacing object created based on the counseling type and changed state of the counseling ticket (1240), and controlling the interfacing object based on the control information (1250).

As described above, the first user may request the server for the counseling through the channel of the second user using the terminal of the first user logged in with an account of the first user. The terminal of the first user may receive an input for requesting the counseling through the channel of the second user from the first user and transmit the same to the server.

Operation 1210 according to an example embodiment may include receiving, through a web site of the second user, an input for requesting for the counseling through the channel of the second user registered in the instant messaging service. The web site of the second user may be linked to the channel of the second user registered in the server. As described above, the first user may input a command for a counseling request to the terminal in the application linked to the channel of the second user as well as the website of the second user.

Operation 1220 according to an example embodiment may correspond to displaying, on the terminal of the first user, the above-described chat interface for counseling provided by the server in response to the counseling request.

Operation 1230 according to an example embodiment may correspond to displaying, on the terminal of the first user, an interfacing object indicating the counseling type added to the chat interface in the server.

The control information received in operation 1240 according to an example embodiment may correspond to control information of an interfacing object created based on the counseling type and the changed state of a counseling ticket created in response to the counseling type in the server.

According to an example embodiment, the operation of controlling the interfacing object may be performed in the server and also in the terminal of the first user, or may be separately performed in the server and the terminal of the first user. As an example, the operation of controlling the interfacing object may be performed as the server transmits control information including a command related to the change of the interfacing object to the terminal, and the terminal changes the interfacing object according to the command included in the control information and displays the changed interfacing object.

Figure 13:
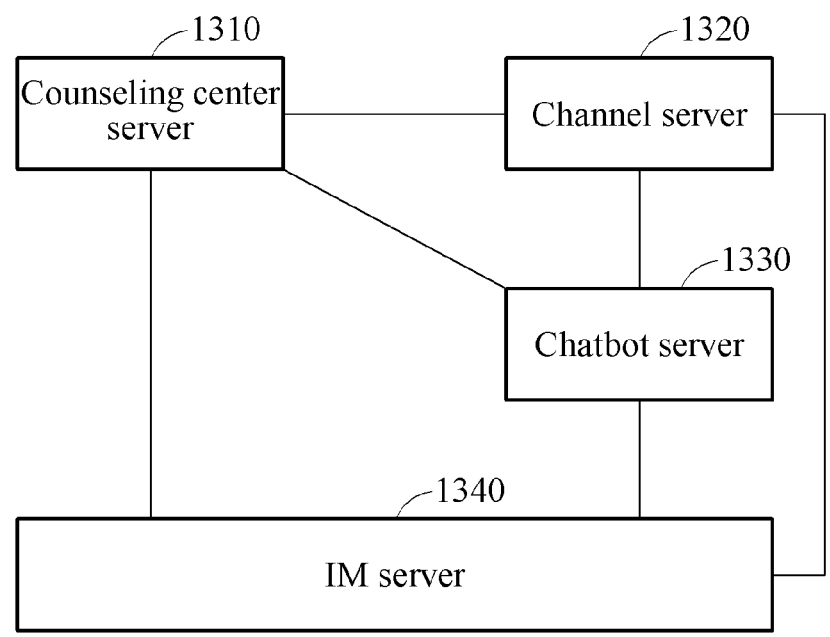
FIG. 13 is an exemplary diagram illustrating a configuration of a counseling system according to an example embodiment.

FIG. 13 is an example diagram of a configuration of a counseling system according to an example embodiment.

Referring to FIG. 13, the counseling system according to an example embodiment may include a counseling center server 1310, a channel server 1320, a chatbot server 1330, and an instant messaging server 1340 (hereinafter referred to as an IM server).

The counseling system may perform an operation related to a counseling service conducted via a chatting manner between a personal account of a first user corresponding to a general user and a channel of a second user corresponding to a specific company or a specific service provider. A counselor linked to the second user's channel may communicate with a counseling center server 1310 through a counseling center app installed on the terminal of the counselor or the counseling center web connected from the terminal of the counselor. In addition, by connecting to the chat room of the channel of the second user, it is possible to transmit and receive messages through the chat room. According to an example embodiment, the counseling center app installed on the terminal of the counselor or the counseling center web accessed from the terminal of the counselor may be connected to the IM server 1340, and communication with the counseling center server 1310 may be performed through the IM server 1340. The first user may communicate with the IM server 1340 through the instant messaging app installed on the terminal of the first user or the instant messaging web accessed from the terminal. It is possible to transmit and receive messages through the chat room through connection to the chat room of the channel of the second user.

According to an example embodiment, the terminal of the first user accessing the chat room of the channel of the second user may transmit a message to the chatbot or transmit a message to a counselor linked with the channel of the second user. A recipient of the message may be determined depending on the type of counseling conducted in the chat room. For example, when the counseling type conducted in the chat room of the channel of the second user is the first counseling type corresponding to the unmanned counseling, the recipient of the message may be determined as a chatbot linked to the channel of the second user. When the counseling type conducted in the chat room of the channel of the second user is the second counseling type corresponding to the manned counseling, the recipient of the message may be determined as a counselor linked to the channel of the second user.

According to an example embodiment, the message transmitted from the terminal of the first user through the chat room of the channel is transmitted to the IM server 1340, and the IM server 1340 transmits the same to the counseling center server 1310 or the chatbot server 1330. For example, the IM server 1340 may transmit the message to the counseling center server 1310 for the message transmitted to the counselor, and transmit the message to the chatbot server 1330 if the message is transmitted to the chatbot. The message transmitted to the chatbot server 1330 may be transmitted from the chatbot server 1330 to the counseling center server 1310. The chatbot server 1330 may create a response message for the message and transmit the created response message to the terminal of the user through the IM server 1340.

According to an example embodiment, the message transmitted from the terminal of the first user through the chat room of the channel is transmitted to the IM server 1340, and the IM server 1340 may transmit the same to a branch server that is a separate server, so that the separate server may transmit the same to the counseling center server 1310 or the chatbot server 1330. The branch server is a server that processes branching of a path through which the message is transmitted, capable of transmitting a message to the counseling center server 1310 when a message is transmitted to a counselor and also transmitting a message to the chatbot server 1330 when the message is transmitted to the chatbot.

According to an example embodiment, when a counseling ticket corresponding to the chat room of the channel to which the message is transmitted is not created, the counseling center server 1310 may create a counseling ticket corresponding to the chat room. As described above, the type of the counseling ticket may be determined based on the type of the counseling conducted in the chat room to which the message is transmitted. For example, when the counseling type at the time that the message is transmitted is the first counseling type corresponding to the unmanned counseling, a first type of counseling ticket may be created. When the counseling type at the time that the message is transmitted is the second counseling type corresponding to the manned counseling, the second type of counseling ticket may be created. According to an example embodiment, it is possible to request the counseling center server 1310 for creation of a counseling ticket while the message is transmitted from chatbot server 1330 to the counseling center server 1310. The counseling center server 1310 receiving the request for creation of a counseling ticket from the chatbot server 1330 may create a first type of counseling ticket.

The counseling center server 1310 may allocate the second type of counseling ticket created to correspond to the chat room of the second user's channel to any one of accounts of a counselor linked to the second user's channel. The counseling center server 1310 may transmit a message received through the chat room corresponding to the second type of counseling ticket to the terminal of the counselor to which the counseling ticket is allocated. The terminal of the counselor may request transmission of a message through the chat room corresponding to the counseling ticket allocated to the counseling center server 1310, and the counseling center server 1310 may transmit a message to the terminal of a user accessed the chat room through the IM server 1340.

According to an example embodiment, the terminal of the first user and the counseling center server may correspond to an electronic device including a memory and a processor. The terminal of the first user and the counseling center server may communicate through a network or may communicate through an instant messaging server.

The terminal of the first user according to an example embodiment may be a fixed terminal implemented as a computer device or a mobile terminal. For example, the terminal of the first user may include a smart phone, a mobile phone, a computer, a laptop computer, a terminal for digital broadcasting, a personal digital assistant (PDA), a portable multimedia player (PMP), and a tablet PC.

The processor of the terminal of the first user according to an example embodiment may perform operations of the terminal of the first user using the counseling service interworking with the instant messaging service described above in FIG. 12, and the processor of the counseling center server may perform operations of the counseling center server interworking with the instant messaging service described above in FIG. 1.

The terminal of the first user and the memory of the counseling center server according to an example embodiment is a computer-readable recording medium which may be a volatile memory or a non-volatile memory. The memory of the counseling center server according to an example embodiment may store information related to the provision of the counseling service described above with reference to FIG. 1, including, for example, an interfacing object corresponding to the counseling state and a counseling ticket including a chat log related to the counseling for each registered channel. The memory of the terminal of the first user according to an example embodiment may store information on the counseling service described above with reference to FIG. 12 and include a code for a browser or application installed and driven in the terminal by files provided from a counseling center server or an instant messaging server through the network.

The example embodiments described herein may be implemented using hardware components, software components, or a combination thereof. For example, the apparatus, method, and components described in the example embodiments may be implemented using a general purpose computer or special purpose computer, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a counseling center server interworking with an instant messaging service, the method comprising:
   acquiring, by the counseling center server and based on an input of a first user for requesting counseling through a channel of a second user registered in the instant messaging service, a counseling type of the requested counseling;
   transmitting, from the counseling center server to an instant messaging server that provides the instant messaging service, the counseling type as acquired;
   displaying a chat interface comprising an interfacing object that allows a user selection of a button including (1) a function of displaying the counseling type and (2) the button to cause a switch between manned counseling and unmanned counseling;
   creating a first type of counseling ticket corresponding to the unmanned counseling or a second type of counseling ticket corresponding to the manned counseling based on the counseling type;
   monitoring a state change event that changes a state of the counseling ticket;
   based on the user selection of the button, switching the counseling type between the manned counseling and the unmanned counseling; and
   controlling, by at least transmitting a signal to the instant messaging server, the interfacing object included in the chat interface for counseling provided to a terminal of the first user to correspond to the channel to indicate a correspondingly switched counseling type and the changed state of the counseling ticket.

2. The method of claim 1, wherein the counseling type comprises: a first counseling type corresponding to the unmanned counseling; and
   a second counseling type corresponding to the manned counseling.

3. The method of claim 1, wherein the controlling of the interfacing object further comprises:
   switching the counseling type based on a request for switching between the manned counseling and the unmanned counseling received from the first user through the chat interface; and controlling the interfacing object to correspond to the switched counseling type.

4. The method of claim 1, wherein the controlling of the interfacing object comprises transmitting a signal for controlling the interfacing object based on whether the counseling type is switched and whether the state of the counseling ticket is changed upon occurrence of the state change event, and wherein, based on the signal for controlling the interfacing object, at least one of operations is performed for the interfacing object, and the operations comprises:
changing a visual sign included in the interfacing object;
adding a visual effect to the interfacing object; and
changing a guide comment included in the interfacing object.

5. The method of claim 1, wherein the creating of the counseling ticket comprises:
creating the first type of counseling ticket when the counseling type is a first counseling type corresponding to the unmanned counseling; and
creating the second type of counseling ticket when the counseling type is a second counseling type corresponding to the manned counseling.

6. The method of claim 1, wherein the monitoring of the state change event further comprises changing the state of the counseling ticket to an end state based on an end event occurring as an end condition of the counseling ticket is satisfied.

7. The method of claim 1, wherein the monitoring of the state change event further comprises at least one of:
changing the state of the second type of counseling ticket to a progress state based on a connection event occurring as a counselor for the channel allocated with the second type of counseling ticket accesses a chat room corresponding to the second type of counseling ticket; and changing the state of the second type of counseling ticket to a pending state based on a pending event that occurs as a pending condition of the second type of counseling ticket is satisfied.

8. The method of claim 1, wherein the acquiring of the counseling type further comprises:
setting the counseling type to a default value of a predetermined counseling type corresponding to the channel; and
controlling the interfacing object to indicate the counseling type set to the default value on the chat interface.

9. The method of claim 1, wherein the unmanned counseling comprises a counseling type conducted using a chatbot linked to the channel, and
the manned counseling comprises a counseling type conducted with a counselor linked to the channel.

10. The method of claim 1, wherein the interfacing object comprises a function of requesting for switch between the manned counseling and the unmanned counseling.

11. A computer program stored in a non-transitory computer-readable medium in combination with hardware to execute the method of claim 1.

12. A counseling center server comprising:
at least one processor configured to:
acquire, based on an input of a first user requesting counseling through a channel of a second user registered in an instant messaging service, a counseling type of the requested counseling;
transmit to an instant messaging server that provides the instant messaging service, the counseling type as acquired;
display a chat interface comprising an interfacing object that allows a user selection of a button including (1) a function of displaying the counseling type and (2) the button to cause a switch between manned counseling and unmanned counseling;
create a first type of counseling ticket corresponding to the unmanned counseling or a second type of counseling ticket corresponding to the manned counseling based on the counseling type;
monitor a state change event that changes a state of the counseling ticket;
based on the user selection of the button, switch the counseling type between the manned counseling and the unmanned counseling; and
control, by at least transmitting a signal to the instant messaging server, the interfacing object included in the chat interface for counseling provided to a terminal of the first user to correspond to the channel to indicate a correspondingly switched counseling type and the changed state of the counseling ticket.

13. The counseling center server of claim 12, wherein the counseling type comprises:
a first counseling type corresponding to the unmanned counseling;
and a second counseling type corresponding to the manned counseling.

14. The counseling center server of claim 12, wherein the processor is configured to:
in controlling the interfacing object,
switch the counseling type based on a request for switching between the manned counseling and the unmanned counseling received from the first user through the chat interface; and
control the interfacing object to correspond to the switched counseling type.

15. The counseling center server of claim 12, wherein the processor is configured to:
in creating the counseling ticket,
create the first type of counseling ticket when the counseling type is a first counseling type corresponding to the unmanned counseling; and
create the second type of counseling ticket when the counseling type is a second counseling type corresponding to the manned counseling.

16. The counseling center server of claim 12, wherein the processor is configured to, in monitoring the state change event, change the state of the counseling ticket to an end state based on an end event occurring as an end condition of the counseling ticket is satisfied.

17. The counseling center server of claim 12, wherein the processor is configured to perform, in monitoring the state change event, at least one of operations of:
changing the state of the second type of counseling ticket to a progress state based on a connection event occurring as a counselor for the channel allocated with the second type of counseling ticket accesses a chat room corresponding to the second type of counseling ticket; and
changing the state of the second type of counseling ticket to a pending state based on a pending event occurring as a pending condition of the second type of counseling ticket is satisfied.

18. The counseling center server of claim 12, wherein the processor is configured to:
in acquiring the counseling type, set the counseling type to a default value of a predetermined counseling type corresponding to the channel; and control the interfacing object to indicate the counseling type set to the default value on the chat interface.

\* \* \* \* \*